UNITED STATES PATENT OFFICE.

JOHN H. STEVENS, OF NEWARK, NEW JERSEY, ASSIGNOR TO THE CELLULOID MANUFACTURING COMPANY, OF NEW YORK, N. Y.

MANUFACTURE OF COMPOUNDS OF PYROXYLINE OR NITRO-CELLULOSE.

SPECIFICATION forming part of Letters Patent No. 269,340, dated December 19, 1882.

Application filed June 12, 1882. (No specimens.)

*To all whom it may concern:*

Be it known that I, JOHN H. STEVENS, of the city of Newark, in the county of Essex and State of New Jersey, have invented certain new and useful Improvements in the Manufacture of Compounds of Pyroxyline or Nitro-Cellulose, of which improvements the following is a specification.

The nitro-cellulose or pyroxyline used in the manufacture of these compounds is obtained by subjecting vegetable fiber to the action of nitric or of nitric and sulphuric acids, as is well understood, and in speaking of nitro-cellulose or pyroxyline throughout this specification I intend to refer to any preparation of vegetable fiber or other material by such treatment as renders it susceptible of the further treatment requisite in order to produce compounds of pyroxyline, whether such compounds be plastic (by which I mean susceptible of being remolded) or non-plastic, the characteristic of the nitro-cellulose or pyroxyline essential for my purpose being its solubility or susceptibility of conversion in and by the liquid solvents which I add to it, as hereinafter specified. The different processes to which I subject the mixtures of these ingredients are fully set forth in this specification; but in all cases I would preliminarily reduce the nitro-cellulose to a fine pulp by grinding it in some one of the known machines adapted to that purpose, and free it from aqueous moisture in the usual way.

I am aware that in England and in the United States numerous patents have been issued for improvements in the class to which my invention appertains, and I recognize the state of the art shown in those patents; but I claim as new the subject-matter hereinafter specified, such claim being based upon discoveries made by me in the course of a long series of experiments, and of an extended employment in the practical manufacture of compounds of pyroxyline or nitro-cellulose.

My invention consists in the employment of certain known fluid substances which I have ascertained by experiment possess respectively the property of dissolving nitro-cellulose under ordinary conditions, as hereinafter explained, and in conjunction with these new solvents and with the nitro-cellulose I have ascertained that I can employ pigments or coloring-matters and other inert substances, and also other substances with which my new solvents may be incorporated, and with which they will co-operate, as hereinafter described, in the manufacture of compounds of nitro-cellulose.

Compounds of pyroxyline or nitro-cellulose may be classified generally under two heads—to wit, plastic compounds and non-plastic compounds. The plastic compounds comprise those in which the solvents employed give the seasoned or cured product, in addition to its other properties, the susceptibility of being remolded into any desired shape by simple heat and pressure, which characteristic distinguishes this class. The non-plastic compounds comprise those in which the solvents employed give a product susceptible of being molded in blocks or masses, and seasoned or cured, and afterward cut, turned, or carved into any desired form, but not adapted to being remolded. I may add that such plastic compounds generally can of themselves be cut, carved, or turned into sheets or shapes, as desired, as well as the non-plastic compounds; but the converse is not equally true—that is to say, the non-plastic compounds of themselves are not well adapted to being remolded, as already stated; but it is also proper to state that the herein-described non-plastic compounds will become susceptible of being remolded by simply incorporating camphor with them, or employing them in conjunction with camphor. Again, I desire to state explicitly that in classifying these compounds as plastic and non-plastic I employ those terms strictly in a technical sense—that is to say, as relating to the practical application or use of the compounds—for it is true in point of fact that when freshly made, and for a greater or less time afterward, and until the evaporation of the volatile solvent from the compound has brought it (the compound) to the "cured" state, any of the non-plastic class may be more or less readily remolded or formed in dies by the application of heat and pressure, and even after becoming cured they may be rendered plastic by the addition of fresh solvent to replace that which had evaporated in curing.

It is proper to state, further, that while all of my new solvents are substances known to chemistry, and the preparation of them well understood by chemists, and while most of them are known in commerce, yet there are some among them the cost of which at the present time would be prohibitory for the ordinary manufacture of compounds of pyroxyline; but my invention contemplates their use under two conditions, either or both of which will render them commercially available in these manufactures—to wit, first, the reduced cost of the ingredients when produced by improved processes in which directions numerous experiments are being made; and, second, the adaptability of such compounds to special uses, in which the cost, however high, is a secondary consideration, and is fully compensated by the peculiar properties essential to such special uses, in which direction the daily extending application of these compounds is also the subject of constant development.

In the course of my practical experience in the manufacture of compounds of pyroxyline I have discovered that liquid solvents are more efficacious in their action if they are sprinkled or sprayed upon the pyroxyline, and the saturated mass inclosed in a tight box or vat and left at rest (or it may be occasionally stirred) during a period of several hours, at the end of which time it will be found that the solvent has permeated the mass of pyroxyline very thoroughly, and brought it to a very favorable condition for being worked in heated rolls, and thus formed into a homogeneous compound, the heat and pressure of the rolls stimulating to its utmost efficiency the solvent action of the menstruum with which the pyroxyline is saturated. On this fact I based my experiments toward the discovery of my new solvents.

Heretofore the best compounds of pyroxyline, as well as the preferred solvents, have had camphor as an ingredient; and it was the object of my experiments to find new menstrua which are in themselves such active solvents of pyroxyline as to render the use of camphor unnecessary, and I have succeeded in this respect to the extent hereinafter set forth.

My new group of active liquid solvents or converting agents comprises oil of spearmint, nitrate of methyl, butyric ether, valeric ether, benzoic ether, formic ether properly dehydrated, salicylate of methyl, formate of amyl, acetate of amyl, butyrate of amyl, valerianate of amyl, sebacylic ether, oxalic ether, amylic ether, (amyl oxide,) oxidized wood alcohol, oil of cassia, oil of cherry, laurel, heavy cinnamon-oil, oil of melissa, (balm,) oil of birch-tar, (rectified,) and oil of pennyroyal. The oxidized wood-alcohol is the product obtained by distilling ordinary commercial wood-alcohol from a mixture of sulphuric acid and an oxidizing agent—such as pyroxide of manganese—or preferably by mixing with commercial wood-alcohol permanganate of potash, and neutralizing the oxidized product by the ordinary purifying processes. This new group of active solvents includes only menstrua which are in themselves solvents of pyroxyline at the ordinary temperature; but in compounding them with the pyroxyline the proportions requisite will vary with the mode of operation—that is, if the mixture or compound is to be worked in open rolls a larger proportion of solvent will be necessary than when the mixture or compound is to be worked in closed rolls, as in the former case allowance must be made for the greater evaporation of the solvent. For a like reason a greater proportion of solvent will be required in using the more volatile menstrua comprised in this group and working the compound in open rolls; but if the machinery employed is inclosed, as is well understood, the proportions of solvent will not vary substantially whichever of these new menstrua is selected. Another case, however, should be mentioned in which the proportion of solvent will necessarily be increased, and that is where the "batch" of the compound is small, as it will always be found that in working a small batch the loss of volatile solvents by evaporation is proportionately greater than in working a larger mass. With these reservations, and subject to such exceptional variations as may be incident to particular cases, I give the proportions which I have tested and found practically efficient with this group of new active solvents—viz., two to three parts, by weight, of any one of the above-specified menstrua, or of any mixture of any two or more of them, to two parts, by weight, of pyroxyline or nitro-cellulose.

Any desired coloring-matters or other ingredients may be compounded with the nitro-cellulose before the solvent is added, and the mixture should be inclosed in a tight vessel, where it is simply left for, say, twelve hours, at the end of which time it will be found in proper condition for being worked in a pair of masticating-rolls, as is well understood, by which the mass will be converted into a solid homogeneous compound.

With the less volatile menstrua of this new group, the working of the compound in the ordinary way is comparatively easy, but in using the more volatile of these new menstrua—such as the ethers specified—greater care is necessary to obtain a good result. As heated rolls are best for the working of the compounds, and as heat materially stimulates the volatility of these ethers, it is best to employ closed machinery in working the compounds when these more volatile solvents are employed. After the mass has been thoroughly worked in the rolls it is pressed into blocks or sheets, and subjected to the seasoning or curing process, as is well understood.

The product obtained with this new group of solvents will be more or less susceptible of being remolded after curing, according to the greater or less volatility of the menstruum or mixture of menstrua employed, the oils giving more and the ethers less remolding property; but as a rule I would classify these products as non-plastic, and would recommend the use of these solvents only for compounds which are not to be molded or pressed into their final shape under heat, but are to be turned, carved, or bent into special shapes or forms in the ordinary ways in which such materials are so treated. In conjunction with these solvents I can, however, use camphor in the usual way, and thus render the compound plastice, as is well understood. I also sometimes employ with the solvents of this group vinous alcohol (spirits of wine) or wood-naphtha, (wood-alcohol,) both ethylic alcohols and methylic alcohols mixing readily with any of the before-specified solvents. The quantity or proportion of such alcohol which can be used with this new group of solvents varies with the greater or less volatility of the solvent itself, the more volatile solvents—such as the ethers specified—taking less of the alcohol than the less volatile solvents, such as the oils specified. For example, I give the following proportions as affording a good solvent mixture, and an approximate rule for other such mixtures, viz: to two parts of pyroxyline, by weight, I add two to three parts, by weight, of a mixture of one to four parts, by weight, of a vinous alcohol, and two parts, by weight, of any one of my hereinbefore-specified new solvents, or of a mixture of any two or more of them; or to two parts of pyroxyline, by weight, I add two to three parts, by weight, of a mixture of one to three parts of methyl alcohol, and one part, by weight, of any one of my hereinbefore-specified new solvents, or of a mixture of any two or more of them. The treatment is the same when either of these alcohols is employed in conjunction with these solvents as when they are used without alcohol, as already described. In all cases the ingredients should be mixed and left in a closed vessel for some hours, and the mass should be worked in heated rolls, open or closed, according as the solvents employed are less or more volatile, as already explained. The products will again be non-plastic in the qualified sense already expressed when alcohol or wood-alcohol is used with the solvents of this group as when my new solvents are used alone without alcohol. This group, then, comprises compounds of pyroxyline and the new active liquid solvents hereinbefore specified, with or without alcohol, ethylic or methylic, and with or without camphor, or of other like solid substance possessing the properties of a latent solvent of the nitro-cellulose.

The value of my improvements will be appreciated by those skilled in the art of manufacturing compounds of nitro-cellulose, as they have experienced the difficulties of working with the limited class of such solvents heretofore known, and they will also fully understand the range of experiment that was involved in ascertaining the properties of my new group of active liquid solvents, and their behavior under the conditions of their use, for it will readily be understood that in ascertaining the availability of my new group of solvents I have also ascertained the unavailability of many other menstrua which it might be supposed would be found equally suitable, but which my experiments have shown are not adapted to such purposes.

Having thus described the nature and object of my improvements, what I claim herein as new, and desire to secure by Letters Patent, is—

As an improvement in the art of manufacturing compounds of pyroxyline or nitro-cellulose, the use of the hereinbefore-specified new group of active liquid solvents or converting agents, substantially as described.

JOHN H. STEVENS.

Witnesses:
WM. L. BRICE,
ABRAHAM MANNERS.